US010192471B2

(12) United States Patent
Gracias et al.

(10) Patent No.: US 10,192,471 B2
(45) Date of Patent: Jan. 29, 2019

(54) DYNAMICAL DISPLAY BASED ON CHEMICAL RELEASE FROM PRINTED POROUS VOXELS

(71) Applicant: THE JOHNS HOPKINS UNIVERSITY, Baltimore, MD (US)

(72) Inventors: David Gracias, Baltimore, MD (US); Yevgeniy Kalinin, Hartsdale, NY (US); Shivendra Pandey, Baltimore, MD (US); Jinpyo Hong, Baltimore, MD (US)

(73) Assignee: The Johns Hopkins University, Baltimore, MD (US)

( * ) Notice: Subject to any disclaimer, the term of this patent is extended or adjusted under 35 U.S.C. 154(b) by 218 days.

(21) Appl. No.: 15/093,856

(22) Filed: Apr. 8, 2016

(65) Prior Publication Data

US 2016/0300382 A1 Oct. 13, 2016

Related U.S. Application Data

(60) Provisional application No. 62/145,140, filed on Apr. 9, 2015.

(51) Int. Cl.
*G02B 26/00* (2006.01)
*G09G 3/00* (2006.01)

(52) U.S. Cl.
CPC .................................... *G09G 3/003* (2013.01)

(58) Field of Classification Search
USPC .......................................................... 359/290
See application file for complete search history.

(56) References Cited

U.S. PATENT DOCUMENTS

| | | | | |
|---|---|---|---|---|
| 8,308,271 | B2 | 11/2012 | Seki et al. | |
| 2004/0227694 | A1* | 11/2004 | Sun | G09G 3/003 345/6 |
| 2009/0311190 | A1* | 12/2009 | Gracias | A61K 9/0097 424/9.3 |
| 2013/0045530 | A1* | 2/2013 | Gracias | B81C 1/00007 435/289.1 |
| 2013/0095258 | A1* | 4/2013 | Gracias | B01L 3/50255 428/29 |

OTHER PUBLICATIONS

Aw, M., et al, "A multi-drug delivery system with sequential release using titania nanotube arrays" Chem. Commun. 48, 3348-3350 (2012).

(Continued)

*Primary Examiner* — Rodney E Fuller
(74) *Attorney, Agent, or Firm* — Johns Hopkins Technology Ventures

(57) ABSTRACT

A device, system, and method for utilizing precisely patterned and chemically loaded three-dimensional porous containers akin to "chemical voxels" is disclosed to enable display of dynamic visual patterns via spatial and temporal control of both local and global chemical release. Variations in porosity, volume, shape and relative positioning of the chemical voxels can be used to control the types of images that are formed with control in both space and time. Static or moving images can be displayed using the device, system, and method of the present invention.

19 Claims, 7 Drawing Sheets

(56) References Cited

OTHER PUBLICATIONS

Calvert, P. "Inkjet printing for materials and devices" Chemistry of Materials, 13(10), 3299-3305 (2001).
Chen, F., et al., "Toward delivery of multiple growth factors in tissue engineering" Biomaterials, 31, 6279-6308 (2010).
Chen, R., et al., "Spatio—temporal VEGF and PDGF delivery patterns blood vessel formation and maturation" Pharm. Res. 24, 258-264 (2007).
Drzaic, P. "Microfluidic electronic paper" Nature Photon. 3, 248-249 (2009).
Jacobs, H., et al., "Fabrication of a cylindrical display by patterned assembly" Science, 296 (5566), 323-325 (2002).
Kalinin, Y., et al., "Three-dimensional chemical patterns for cellular self-organization" Angew. Chem. Int. Ed. 50, 2549-2553 (2011).
Lee, H., et al., "Inkjet printing of nanosized silver colloids" Nanotechnology, 16(10), 2436 (2005).
Leong, T., et al., "Surface tension-driven self-folding polyhedra" Langmuir, 23, 8747-8751 (2007).
Pandey, S., et al., "Origami inspired self-assembly of patterned and reconfigurable particles" J. Vis. Exp. 72 (2013).
Park, S., et al., "Printed assemblies of inorganic light-emitting diodes for deformable and semitransparent displays", Science, 325(5943), 977-981 (2009).
Randall, C., et al., "Three-dimensional microwell arrays for cell culture" Lab Chip, 11(1), 127-131(2011).
Wood, K., et al., "Controlling interlayer diffusion to achieve sustained, multiagent delivery from layer-by-layer thin films" Proc. Natl. Acad. Sci. U.S.A. 103, 10207-10212 (2006).
Wood, V., et al., "Inkjet-printed quantum dot—polymer composites for full-color AC-driven displays" Adv. Mater. 21(21), 2151-2155 (2009).
Ye, H., et al., "Remote radio frequency controlled nanoliter chemistry and chemical delivery on substrates" Angew. Chem. Int. Ed. 46, 4991-4994 (2007).

* cited by examiner

DYNAMICAL DISPLAY BASED ON CHEMICAL RELEASE FROM PRINTED POROUS VOXELS

CROSS REFERENCE TO RELATED APPLICATIONS

This application claims the benefit of U.S. Provisional Patent Application No. 62/145,140 filed Apr. 9, 2015, which is incorporated by reference herein, in its entirety.

GOVERNMENT SUPPORT

This invention was made with government support under CBET-1066898 awarded by the National Science Foundation and 1DP2OD004346-01 awarded by the National Institutes of Health. The government has certain rights in the invention.

FIELD OF THE INVENTION

The present invention relates generally to visual display. More particularly, the present invention relates to an optical display based on chemical release from printed porous voxels.

BACKGROUND OF THE INVENTION

Present-day display technologies such as liquid crystal displays, flexible displays, printable electronic displays, electronic paper displays, conformable displays, and wearable displays have become ubiquitous. However in all of these existing displays, the information displayed by individual pixels is not stored in the pixels themselves but instead sent to the pixels from an external source typically through wired interfaces. Such interfaces which are required to transmit information and address individual pixels can make displays fairly complex and the electrical power required to operate them can limit utility of these devices. There also exists a technological gap between processes used in conventional media such as painting or printing and those used to create electronic displays. In printing technologies for instance, once information is sent to the printer to be printed on paper, the dynamic aspect of the information is lost. Hence, printers are only capable of producing static images, with the exception of lenticular printing, where multiple patterns are printed on the same image and a change of the observation angle of the printed image alters the displayed pattern.

Accordingly, it would be beneficial to provide a new approach for generating moving visual images where the information to be displayed is geometrically encoded in the pixels themselves and the pixels can be dispensed using a variety of techniques such as manual dispensation or nozzle based printing approaches amenable to both rigid and flexible substrates.

SUMMARY OF THE INVENTION

The foregoing needs are met, to a great extent, by the present invention which provides a method for creating images via chemical release including synthesizing chemical voxels, each in a voxel housing, wherein the voxel housing defines a volume, shape, and a porosity. The method includes dispensing and arranging the voxels into well-ordered arrays. The method also includes releasing chemicals with both local and global control based on numerical simulations.

In accordance with an aspect of the present invention, the method includes achieving controlled release in a way comprising one of a group consisting of continuous form, pulsatile form, spontaneous form, diffusion, or in response to various stimuli such as pH, temperature, electric field, magnetic field, ultrasound, and light radiation. The method also includes using temporal control to actuate the chemical release. Additionally, the method includes using anisotropic or patterned particles and using voxel housing comprising one chosen from a group consisting of porous capsules, microgel particles, or reservoir systems. The images can be configured to move.

In accordance with an aspect of the present invention, a system for creating images via chemical release includes voxel housings, wherein each of the voxel housings define a volume, shape and porosity, wherein the voxel housings are configured to hold an amount of chemical, and wherein the voxel housings can be configured into a voxel array. The system also includes a chemical release mechanism, wherein the chemical release mechanism is configured to dispense chemical to generate the image.

In accordance with another aspect of the present invention, the voxel housings are configured to be arranged in a well ordered array. The voxel housings are one chosen from a group of porous capsules, microgel particles, or reservoir systems. The system can include one selected from a group of a pencil-like device, a marker-like device, an inkjet printer, and a three-dimensional printer for dispensing the voxels. The voxel housing can include a color. A source of temporal control can be included to actuate the voxels. The system can include anisotropic or patterned particles. The voxel housings are configured to be arranged in one selected from a group consisting of 2D and 3D orientations. The system also includes a device for controlled release further including controlled release in a form of one selected from a group of continuous, pulsatile, diffusion, and in a response to stimuli.

BRIEF DESCRIPTION OF THE DRAWINGS

The accompanying drawings provide visual representations, which will be used to more fully describe the representative embodiments disclosed herein and can be used by those skilled in the art to better understand them and their inherent advantages. In these drawings, like reference numerals identify corresponding elements and.

DETAILED DESCRIPTION

Figures 1A, 1B, 1C, 1D, 1E, 1F:
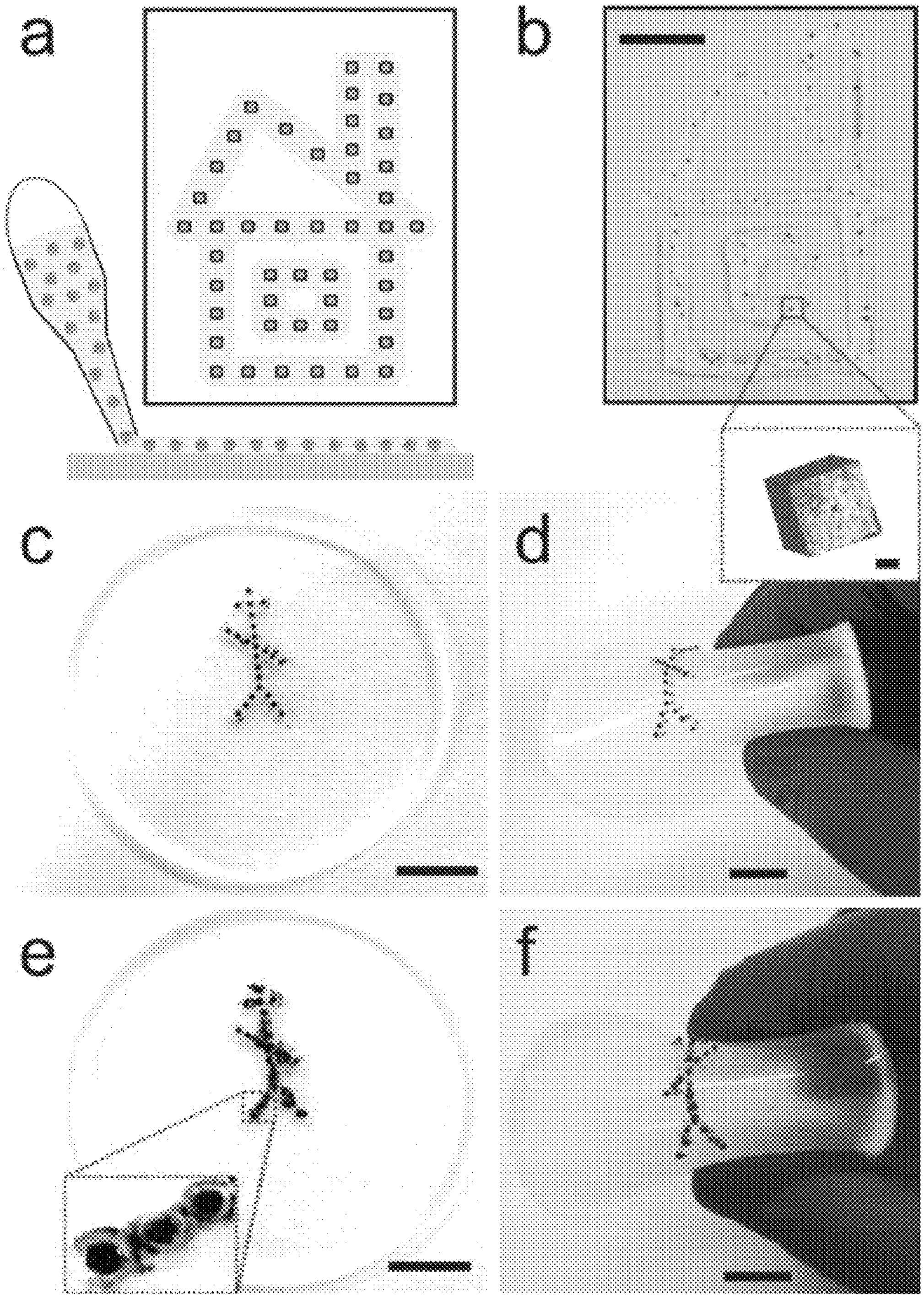
FIGS. 1A-1F illustrate images of exemplary implementations of image generation according to an embodiment of the present invention.

The presently disclosed subject matter now will be described more fully hereinafter with reference to the accompanying Drawings, in which some, but not all embodiments of the inventions are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated Drawings. Therefore, it is to be understood that the presently disclosed subject matter is not to be limited to the specific embodiments disclosed and that modifications and other embodiments are intended to be included within the scope of the appended claims.

An embodiment in accordance with the present invention is directed to a device, system, and method for utilizing precisely patterned and chemically loaded three-dimensional porous containers akin to "chemical voxels" to enable dynamic visual patterns via spatial and temporal control of both local and global chemical release. Variations in porosity, volume, shape and relative positioning of the chemical voxels can be used to control the types of images that are formed with control in both space and time. Static or moving images can be displayed using the device, system, and method of the present invention.

The present invention is inspired by concepts from the field of controlled release which is focused on the development of particles and devices that can be used to release chemicals often drugs, with precise temporal characteristics. Controlled release can be achieved in a continuous or pulsatile form, either spontaneously by diffusion or in response to various stimuli such as pH, temperature, electric field, magnetic field, ultrasound, and light radiation. In addition to temporal control, recent studies using anisotropic or patterned particles have demonstrated chemical release with spatial variations as well. Chemical diffusion has also been used to generate wave-like reaction diffusion patterns and to actuate microstructures. In the exemplary embodiments, controlled diffusion from chemical sources is also used, but importantly, it is demonstrated that by tuning the characteristics of the voxels themselves as well as their relative spatial arrangement, well-defined animations are possible. Drawing an analogy to digital display technology, these sources are referred to as chemical voxels. This is the first demonstration of the concept of a chemical display.

Chemical displays do not require any wiring, back-end interfaces, interconnects, batteries or external power sources. The chemical voxels can be dispensed manually or via printing modalities both on rigid and flexible substrates and either in 2D or 3D to generate a variety of moving images on a variety of media, making it possible to create animations with conventional artistic techniques. The voxels can be loaded with chemicals multiple times and hence are reusable. There is considerable versatility and tunability in the time scale of the image especially if images need to be generated over long times. Further, as shown, it is possible to design specific moving images in silico using simulations and that these designs correlate well with experiments, allowing for a rational and software design of moving images in the display.

In order to create moving images via chemical release, it is necessary to control the concentration of the chemical in both space and time, both locally at each voxel as well as over the entire image. Importantly, both the concentration of chemical and timing (start, peak and end of the chemical release) can be controlled via manipulation of the characteristics of the porous voxels. Consequently, the essential components of the approach of the present invention require: (a) a high throughput strategy to synthesize chemical voxels in the form of capsules or containers with well-defined volume, shape and porosity, (b) a strategy to dispense and arrange the voxels into well-ordered arrays, and (c) design criterion for programmed chemical release with both local and global control based on numerical simulations. A wide range of chemical voxels such as porous capsules, microgel particles or reservoir systems could be utilized. Of these, polymer and gel based particles can be readily mass-produced in a relatively inexpensive manner but they offer limited control over directional release. In the present invention, self-folding polyhedral voxels are used, which feature a high degree of control over shape, volume, pore size and distribution in all three dimensions. Hence, they serve as a model chemical voxel system to illustrate the concept of chemical display via controlled chemical release.

The concept of the present invention is demonstrated in an exemplary embodiment of printing voxels by writing the shape of a house with a pipette loaded with voxels or alternatively manually arranging them in the shape of a man, as illustrated in FIGS. 1A-1F. While the present exemplary embodiments were implemented by hand it could also be implemented by an automated nozzle based computer controlled printing techniques allowing arrangements in both 2D and 3D. From a functional standpoint, as shown in FIGS. 1A-1F, voxels can be arranged both on rigid and flexible substrates highlighting the ability to create displays by chemical diffusion on a variety of substrates such as paper, fabric, tissue and plastic in 2D, curved and folded geometries. It is important to note that it can be challenging to create displays using conventional electronic pixels on such media due to the incompatibility of soft materials with the high temperatures and vacuum-based processes used in microelectronic fabrication.

Figures 2A, 2B, 2C, 2D, 2E, 2F:
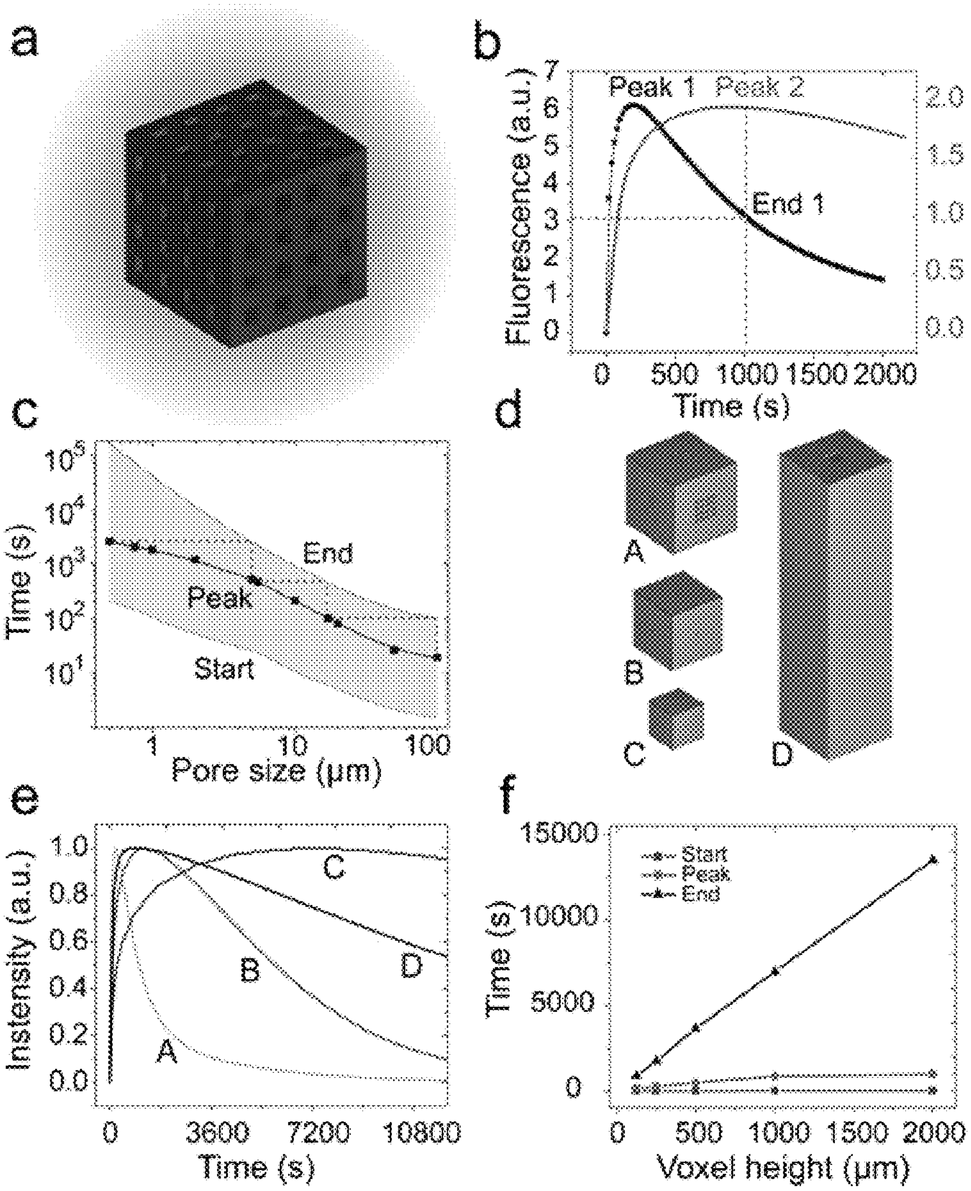
FIGS. 2A-2F illustrate schematic and graphical views of chemical release for image generation according to an embodiment of the present invention.

To illustrate control over the timing of chemical release via variation in porosity and shape of the voxel a cube with porous walls was considered, as illustrated in FIG. 2A. When the porous cubic voxel filled with a chemical is placed into a stationary diffusion medium, the chemical starts diffusing through the pores on the surface. The temporal characteristics of the chemical release, such as its duration of release, timings of start, peak and end can be controlled via geometric design parameters such as porosity, shape and volume of the voxels. The "start" of the chemical release is defined as the time when chemical starts coming out and its concentration in the vicinity of the voxel is one half (½) of the maximal value. The "peak" is defined as the time when the concentration in the vicinity is maximal and the "end" as the time when the concentration of the chemical reaches one half (½) of its maximal value in the vicinity of the voxel, as illustrated in FIG. 2B. The use of the (½) factor in the definition of "start" and "end" is arbitrary; any other reasonable number could also be chosen, such as (1/10) which would lead to further time separation between peaks of chemical release from multiple voxels. It should be noted that the decay in chemical concentration occurs exponentially and thus never fully reaches a zero value.

Figures 6A, 6B:
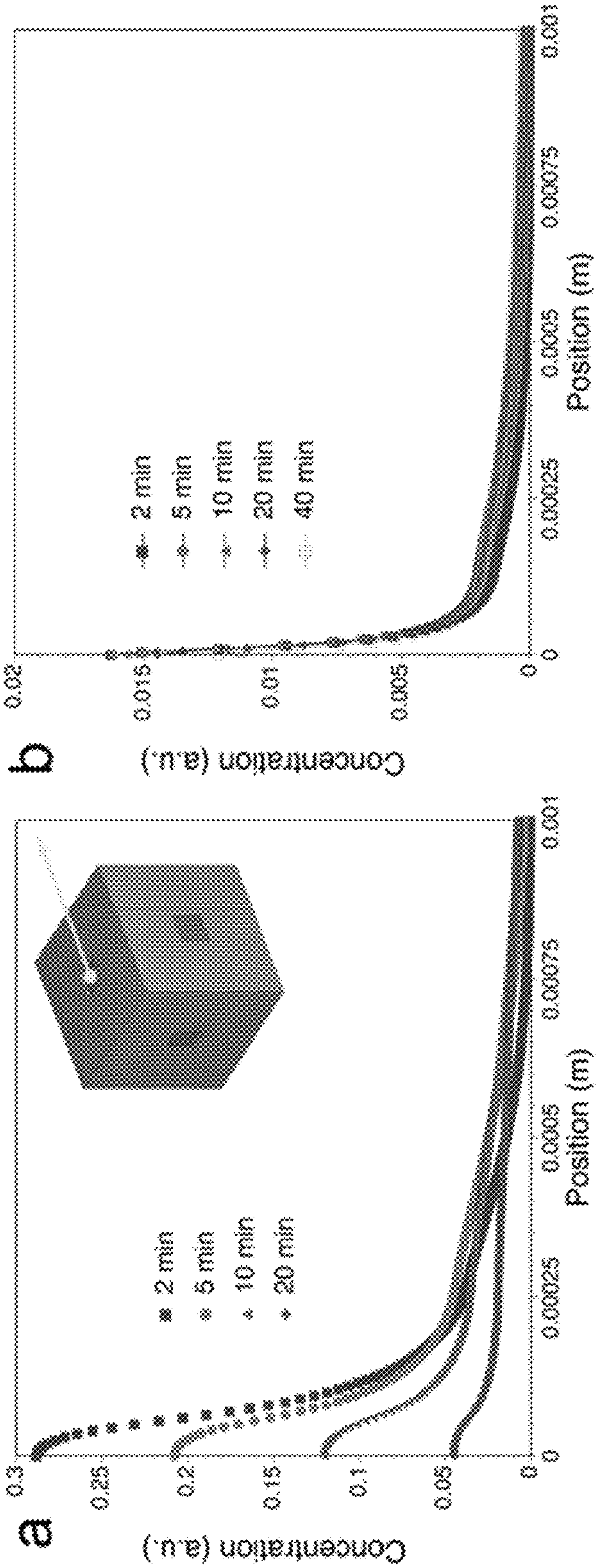
FIGS. 6A and 6B illustrate graphical views of a typical spatial profile of the chemical concentration around a cubic voxel in a stationary diffusion medium.

A typical spatial profile of the chemical concentration around a cubic voxel in a stationary diffusion medium is shown in FIGS. 6A and 6B. The simulations of the exemplary embodiments suggest that the separation of peaks can be controlled by varying pore sizes and volumes of the voxels, as illustrated in FIG. 2B. Larger pores result in faster release of chemicals in the vicinity of the voxel and shorten the duration of chemical release. An important feature of the present invention is the ability to generate a moving image and to this end it is possible to synchronize the release times from different chemical voxels by varying the pore size and volume of the voxels, so that, for example, some voxels will only start releasing chemicals when other voxels have released almost all of their content, as illustrated in FIG. 2C. This approach can be utilized for "programming" various time-dependent chemical patterns by placing precisely designed voxels in the immediate vicinity of each other. Because the duration of the chemical release depends on pore size and volume, =voxels of different geometry can be used with different pore characteristics to control the separation of peaks and the duration of chemical release as illustrated in simulation results, as illustrated in FIGS. 2D-2F.

Figures 3A, 3B, 3C:
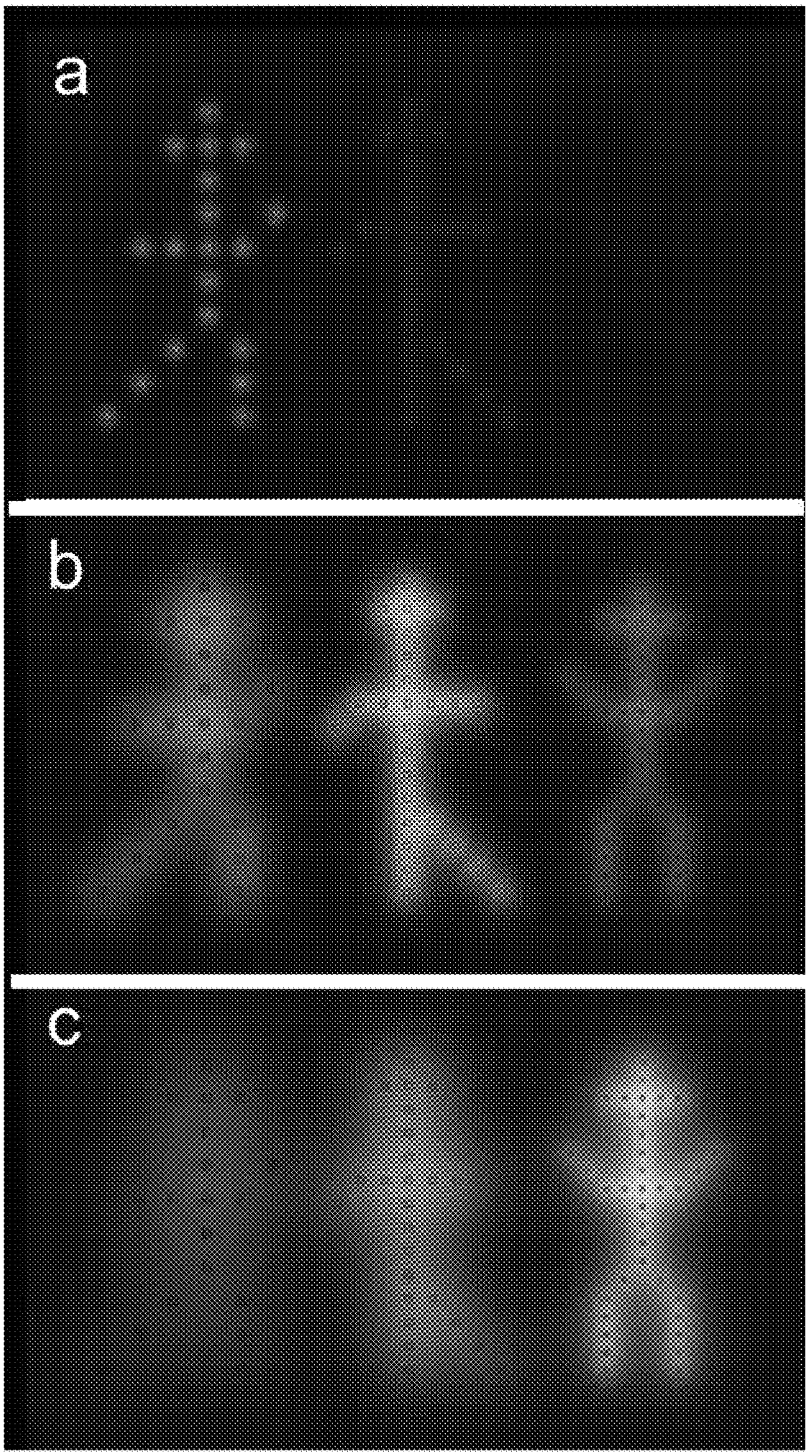
FIGS. 3A-3C illustrate exemplary images according to an embodiment of the present invention.

In another exemplary embodiment, the concept of an animated chemical display is demonstrated by arranging chemical voxels of different volumes, pore sizes and chemical concentrations in an array to generate moving frames of a "running man". The animation was first designed using simulations and then validated in experiments. As in conventional animations, the moving image of the running man was broken up into a sequence of three static images or frames and performed numerical simulations for appropriate arrangements of cube shape voxels with three different volumes, pore sizes and chemical concentrations to generate three frames, as illustrated in FIGS. 3A-3C. In order to control the voxel's start, peak and end timings, the voxel volume and pore size were varied. The simulations suggest that a moving image from left to right can be generated by arranging chemical voxels with decreasing volume, decreasing pore size and increasing concentration from left to right. Thus, the frame on the left should be constructed using voxels with the largest volume, largest pore size and lowest chemical concentration while the one on the right should be constructed with voxels of the smallest volume, smallest pore size and highest chemical concentration. This arrangement is done to control the duration of chemical release for the three frames of the "running man" figure with their peaks well-separated. As time goes by, the chemical in the voxels of the first frame are depleted (reaches half of the maximal concentration in vicinity) while the concentration of the chemical for second frame is maximum. The same process repeats during generation of the third frame. Thus, the simulations suggest that moving images can be generated by discretization of frames and arrangement of appropriately designed voxels in terms of their physical dimensions, porosity and loaded chemical concentrations. To create a single animated figure the frames can be arranged either in the same location or on top of each other.

Figures 4A, 4B, 4C, 4D:
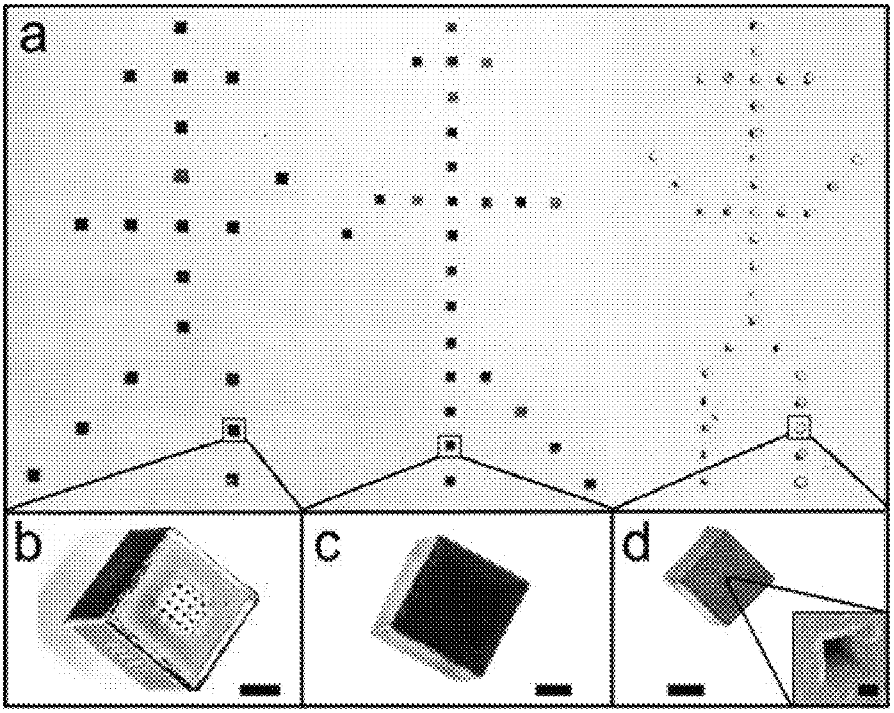
FIG. 4A-4D illustrate image and schematic diagram views of image generation, according to an embodiment of the present invention.

In order to validate this concept experimentally, fluorescein loaded cubic voxels were used. First, the chemical voxels were fabricated using surface tension driven self-assembly, by a process that has been detailed previously. Briefly, pre-patterned planar templates of a desired shape are defined on a sacrificial layer using photolithography with metal frames and solder hinges. The templates are released by dissolving the sacrificial layer and self-assemble into porous polyhedra with well-sealed edges on heating due to surface energy minimization of the molten solder hinges. Cubic voxels of various sizes were used with various pore characteristics and arranged them on a glass slide to represent fixed chemical sources or chemical voxels for the generation of three frames of a running man in a chemical display, as illustrated in FIG. 4.

Figures 5A, 5B, 5C:
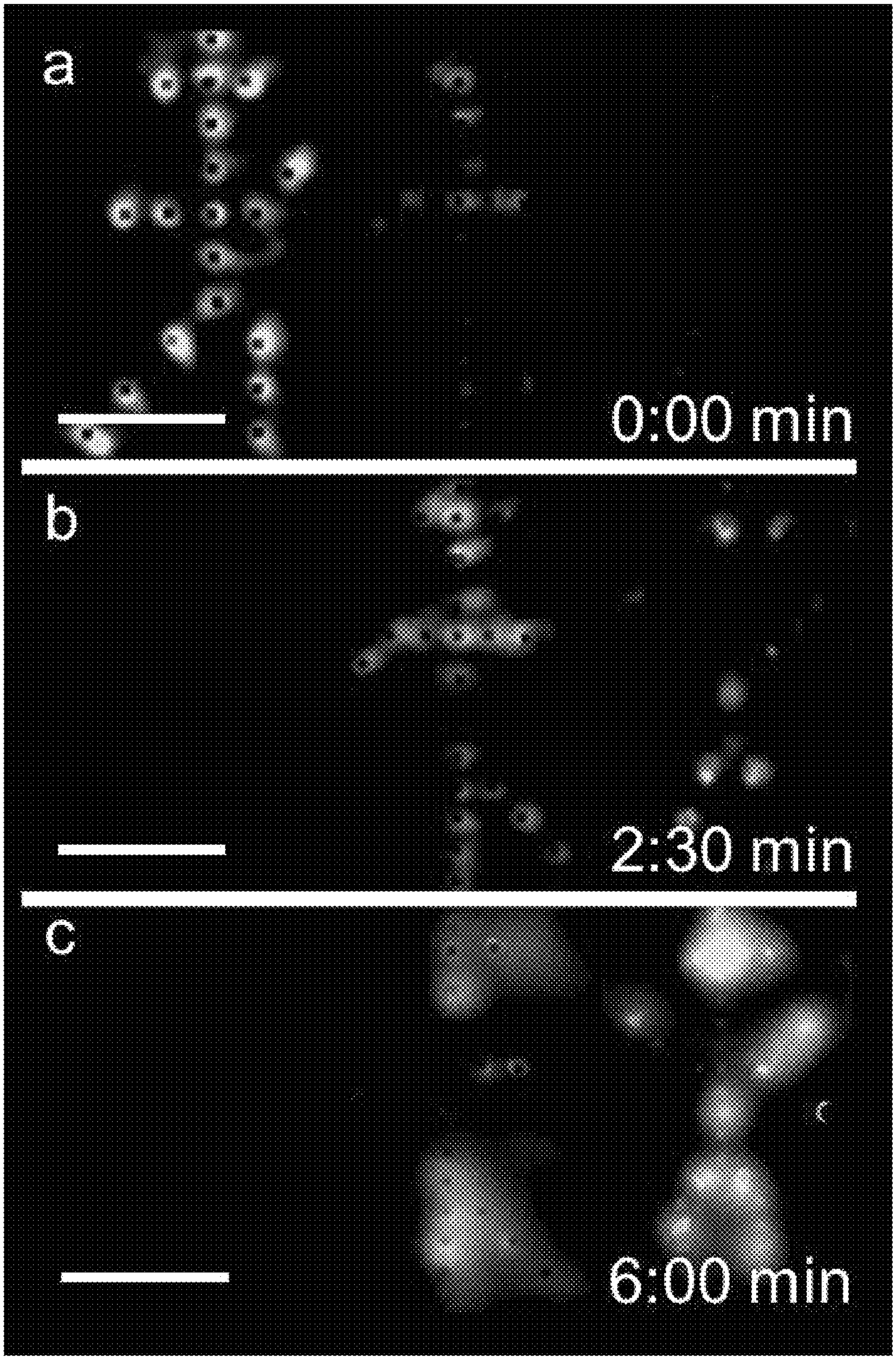
FIGS. 5A-5C illustrate exemplary images according to an embodiment of the present invention.

Fluorescein loaded voxels were used to visualize the image, but alternate chemicals with different colors could also be utilized. As designed, the first frame appears at the time when the fluorescence intensity of fluorescein released from the chemical voxels constituting this frame reaches its peak. When the fluorescence intensity of the first frame decreases to the half of its maximal value, the fluorescence intensity of the voxels in second frame reaches the peak and thus the second frame becomes visible. Similarly, when the fluorescence intensity of the chemical voxels in the second frame reduces to half of its maximal value, the third frame becomes visible. Hence, the three frames appear one after the other from left to right in agreement with simulations, as illustrated in FIG. 5.

The exemplary embodiments provide an attractive approach to create chemical displays. The resolution of the display is based on the size of the chemical voxels as well as their spacing. In comparison to conventional electronic displays, while no sharp "pixel" boundaries can be formed by a diffusion process, the gradients of chemical concentration in the vicinity of the pores are very high, as illustrated in FIGS. 6A and 6B. Accordingly, the size of the chemical "pixel" is comparable to the size of the voxel that created it. High chemical gradients also allow the pixels to remain visible even as the chemical background concentration increases. This is essential for the voxels that are programmed to become visible at later times as more and more chemical voxels release their chemical content. Released chemicals can also be chosen for their reactive properties with other chemicals being released. The released chemicals can react with one another. Reactive additives and layers can also be used to create variations in intensity and shade.

When working with multiple voxels at close spacing, a chemical voxel will alter the concentration in the vicinity of its neighbors which has some effect on the chemical release from the neighboring voxels; these effects were taken into account in the simulation of the running man. In terms of the size of the voxels, a variety of nanostructured liposomes, microgel particles or even similar self-folded containers already exist at 100 nm length scales which is a size far smaller than the 10 micron size range of conventional toner particles used in 600 dots per inch printing technologies. As noted earlier, higher precision approaches such as traditional ink-jet or 3D printing could also be utilized on unpatterned or patterned substrates. Pre-patterned substrates could also aid in registry.

Further, arranging chemical voxels on a preexisting grid ensures a precise positioning and thus local voxel diffusion can be optimized for a specified layout. In this arrangement the reusable array of voxels which releases the fluorescent dye via diffusion behaves as other displays, such as electrophoretic spheres (also known as eInk) or a prototype microfluidic display. The main difference between the chemical display presented here and other techniques is the absence of external connections or interfaces in the present invention Here, the timing information is encoded in the voxels themselves and it is programmed via engineering the volume, porosity and chemical concentration of the voxels. While the exemplary embodiments were shown using diffusion from passive voxels, it could as well utilize existing stimuli responsive voxels such as those responsive to light, radio frequency or ultrasound allowing on-demand or remotely controlled animations. Further, the substrates with chemical voxels printed on them can be reused by either simply submerging them in the solutions of the dyes, creating a microfluidic interface or by relying on chemical reactions; these features are important from a recycling and sustainability standpoint. Lastly, additional time and color variability can be added by utilizing multiple chemicals, such as ones with lower diffusion coefficients.

In addition to applications in media, the methodology of the present invention could also be used in biotechnology and bioengineering to create programmable chemical patterns such as dynamic gradients to direct cellular behaviors or in diagnostics. In the case of a single chemical release from multiple containers, this technique can be used to create complicated release profiles in a manner similar to the Fourier decomposition. Alternatively the technique can be used to time the release of multiple chemicals such as growth factors where sequential release is known to be critical for the formation of organized tissues and organs. The proposed methodology would complement existing techniques, while allowing for precise timing of the release by relying only on the shape and size variations of the voxels.

The numerical simulations were completed using COMSOL Multiphysics (COMSOL, Inc.). The voxels were assumed to be surrounded by a 4 mm thick stationary medium. In addition, zero boundary conditions were assumed thus disregarding the possibility that chemicals released by neighboring voxels affect chemical release from any given voxel.

In the exemplary embodiments, the voxels were fabricated in a high throughput manner using surface tension driven self-assembly technique in which prepatterned 2D templates of voxels self-fold and self-seal due to minimization of surface energy of the molten hinges. Planar templates of voxels were designed using AutoCAD and printed them on transparency film to make photomasks. Using these photomasks lithography was utilized, electroplating and wet etching techniques to pattern 2D panels and solder hinges. The hinged templates were released from the substrate by dissolving sacrificial layer and heated above melting point of solder to fold templates into perfectly closed and sealed voxels. In order to decrease pore size below the resolution of transparency film photomasks, which was 8 μm in this case, gold (Au) was deposited by electroplating on the inside and outside of the cubes after self-assembly. The final size of the pores was determined by the amount of gold electroplated.

Voxels can either be positioned manually or by nozzle based printing. In order to write a house shape, as illustrated in FIG. 1B, approximately 200 cube shaped voxels were added in a 2 mL (1% w/v) agarose gel and mixed well using a pipette. Disposable transfer pipettes (Fisherbrand™; Catalog No. 13-711-7M) were used to write a shape of house on a glass slide. The gel solidified in 5-7 minutes at room temperature. To create the design of a man on a flexible surface, as illustrated in FIGS. 1C-1F, the elastomer base and curing agent (Dow Corning Sylgard® 184 Silicone Elastomer Kit) were mixed together in a ratio of 10:1 (w/w) and put it in a desiccator to remove bubbles. After removing the bubbles, it was cured at 650 C for 2 hours to prepare a flexible polydimethylsiloxane (PDMS) substrate. The 300 μm sized dodecahedron shaped voxels were positioned manually on the PDMS surface and attached with an adhesive (Gorilla Glue; Catalog No. 23629-1002). In order to load dodecahedral voxels, the voxels were covered with a green color liquid dye (McCormick Food Color & Egg Dye) and put it in a desiccator for 10 minutes to speed up the loading process. The excess dye was removed by rinsing the voxels with distilled water and dried the excess by wiping with Kimwipes.

Similarly, for animations of a running man, as illustrated in FIGS. 4A-4D and 5A-5C, the cubic voxels were positioned manually to form three frames of a running man figure and attached them on glass slides using an adhesive (Gorilla Glue; Catalog No. 23629-1002). Arrayed voxels were loaded with fluorescein (Sigma-Aldrich; Fluorescein Sodium Salt, Catalog No. 231-791-2) by soaking them in aqueous solutions overnight. In the case of voxels with small pores, the voxels were placed in a desiccator to remove air bubbles and speed up the chemical loading. The concentrations of chemicals to be loaded in the voxels were calculated numerically in accordance with the numerical simulations, as illustrated as FIGS. 3A-3C and FIG. 5. To generate the moving images as shown in FIG. 5, solutions of fluorescein were utilized with different concentrations, 2 mM aqueous solution for the first frame, 4 mM for the second frame and 15 mM fluorescein solution for the third frame, from left to right.

Figure 7:
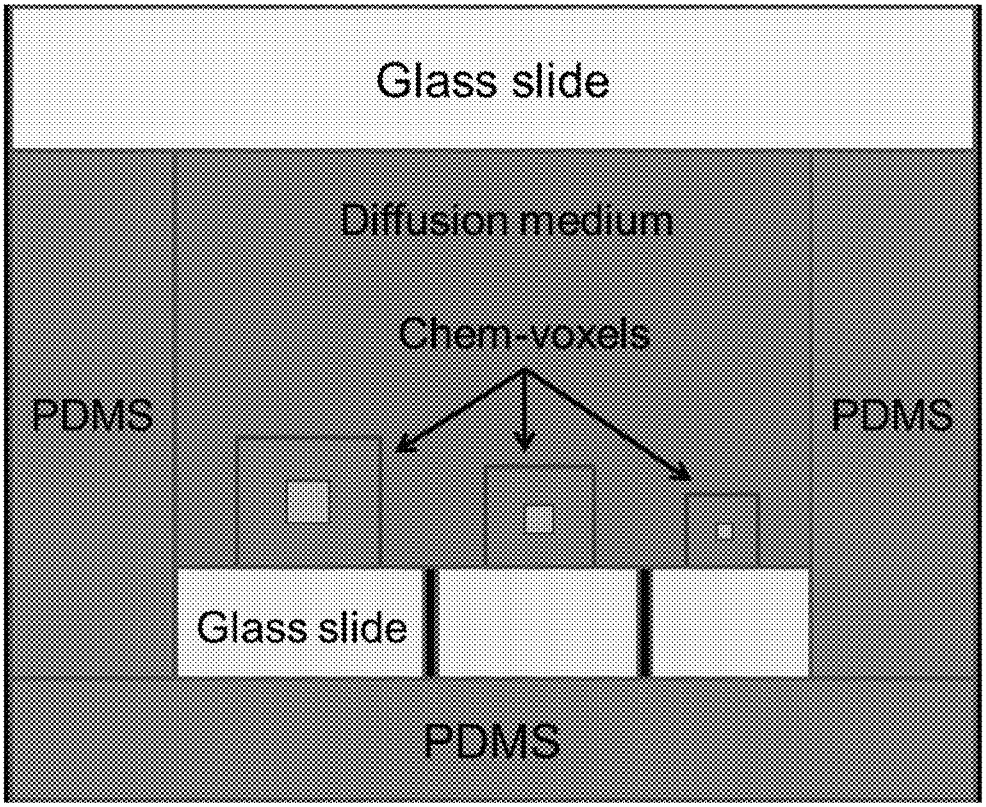
FIG. 7 illustrates a schematic diagram of a voxel set-up according to an embodiment of the present invention.

For moving images of the running man, as illustrated in FIG. 5, loaded chemical voxels were rinsed briefly with water and gently wiped them to remove any excess fluorescein that remained on the outer surface of the voxels. The arrayed voxels were placed in a 4 mm tall PDMS chamber and gently poured a mix of glycerol, ethyl alcohol and water in a ratio of 2:1:1 (v/v) onto the chemical voxels. A schematic of the experimental set-up is shown in FIG. 7. The diffusion of fluorescein is imaged under a fluorescent microscope. Each frame was imaged separately but at the same time and then stitched together to make an animation of three frames thus illustrating a running man figure from left to right.

It should be noted that the system described herein can include a computing device such as a microprocessor, hard drive, solid state drive or any other suitable computing device known to or conceivable by one of skill in the art. The computing device can be programmed with a non-transitory computer readable medium that is programmed with steps to execute the different stimulation levels, patterns, and configurations available.

Any such computer application will be fixed on a non-transitory computer readable medium. It should be noted that the computer application is programmed onto a non-transitory computer readable medium that can be read and executed by any of the computing devices mentioned in this application. The non-transitory computer readable medium can take any suitable form known to one of skill in the art. The non-transitory computer readable medium is understood to be any article of manufacture readable by a computer. Such non-transitory computer readable media includes, but is not limited to, magnetic media, such as floppy disk, flexible disk, hard, disk, reel-to-reel tape, cartridge tape, cassette tapes or cards, optical media such as CD-ROM, DVD, blu-ray, writable compact discs, magneto-optical media in disc, tape, or card form, and paper media such as punch cards or paper tape. Alternately, the program for executing the method and algorithms of the present invention can reside on a remote server or other networked device. Any databases associated with the present invention can be housed on a central computing device, server(s), in cloud storage, or any other suitable means known to or conceivable by one of skill in the art. All of the information associated with the application is transmitted either wired or wirelessly over a network, via the internet, cellular telephone network, or any other suitable data transmission means known to or conceivable by one of skill in the art.

The many features and advantages of the invention are apparent from the detailed specification, and thus, it is intended by the appended claims to cover all such features and advantages of the invention, which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A method for creating dynamic, moving images via chemical release comprising:

synthesizing chemical voxels, each in a voxel housing, wherein the voxel housing defines a volume, shape, and a porosity;

dispensing and arranging the voxels into well-ordered arrays based on numerical simulations;

releasing chemicals with both local and global control; and generating a dynamic, moving image by using the numerical simulations to arrange the chemical voxels with decreasing volume, decreasing pore size, and increasing concentration in a direction of movement.

2. The method of claim 1 further comprising achieving controlled release in a way comprising one of a group consisting of continuous form, pulsatile form, spontaneous form, diffusion, or in response to various stimuli such as pH, temperature, electric field, magnetic field, ultrasound, and light radiation.

3. The method of claim 1 further comprising using temporal control to actuate the chemical release.

4. The method of claim 1 further comprising using anisotropic or patterned particles.

5. The method of claim 1 further comprising using voxels housing comprising one chosen from a group consisting of porous capsules, microgel particles, or reservoir systems.

6. The method of claim 1 further comprising configuring the images to move.

7. The method of claim 1 where voxels are dispensed using manual, pencil or marker-like device, inkjet or 3D printing.

8. The method of claim 1 wherein the released chemicals react with each other.

9. The method of claim 1 where voxels are dispensed on both rigid and flexible substrates such as paper, fabric, flexible polymers, plastics, wood, silicon, skin and tissue.

10. The method of claim 1 to create multi-color dynamical displays by loading multiple chemicals into voxels as well as varying the exterior color of the voxels themselves.

11. A system for creating images via chemical release comprising:

voxel housings, wherein each of the voxel housings define a volume, shape and porosity, wherein the voxel housings are configured to hold an amount of chemical, and wherein the voxel housings can be configured into a voxel array based on numerical simulations;

a chemical release mechanism, wherein the chemical release mechanism is configured to dispense chemical to create the image; and, wherein the voxels housings are further arranged with decreasing volume, decreasing pore size, and increasing concentration in a direction of movement to generate a dynamic, moving image by using the numerical simulations.

12. The system of claim 11 wherein the voxel housings are configured to be arranged in a well ordered array.

13. The system of claim 11 wherein the voxel housings comprise one chosen from a group consisting of porous capsules, microgel particles, or reservoir systems.

14. The system of claim 11 further comprising one selected from a group consisting of a pencil-like device, a marker-like device, an inkjet printer, and a three-dimensional printer for dispensing the voxels.

15. The system of claim 11 wherein the voxel housing comprise a color.

16. The system of claim 11 further comprising a source of temporal control to actuate the voxels.

17. The system of claim 11 further comprising anisotropic or patterned particles.

18. The system of claim 11 further comprising the voxel housings configured to be arranged in one selected from a group consisting of 2D and 3D orientations.

19. The system of claim 11 further comprising a device for controlled release further comprising controlled release in a form of one selected from a group consisting of continuous, pulsatile, diffusion, and in a response to stimuli.

* * * * *